Figure 1:
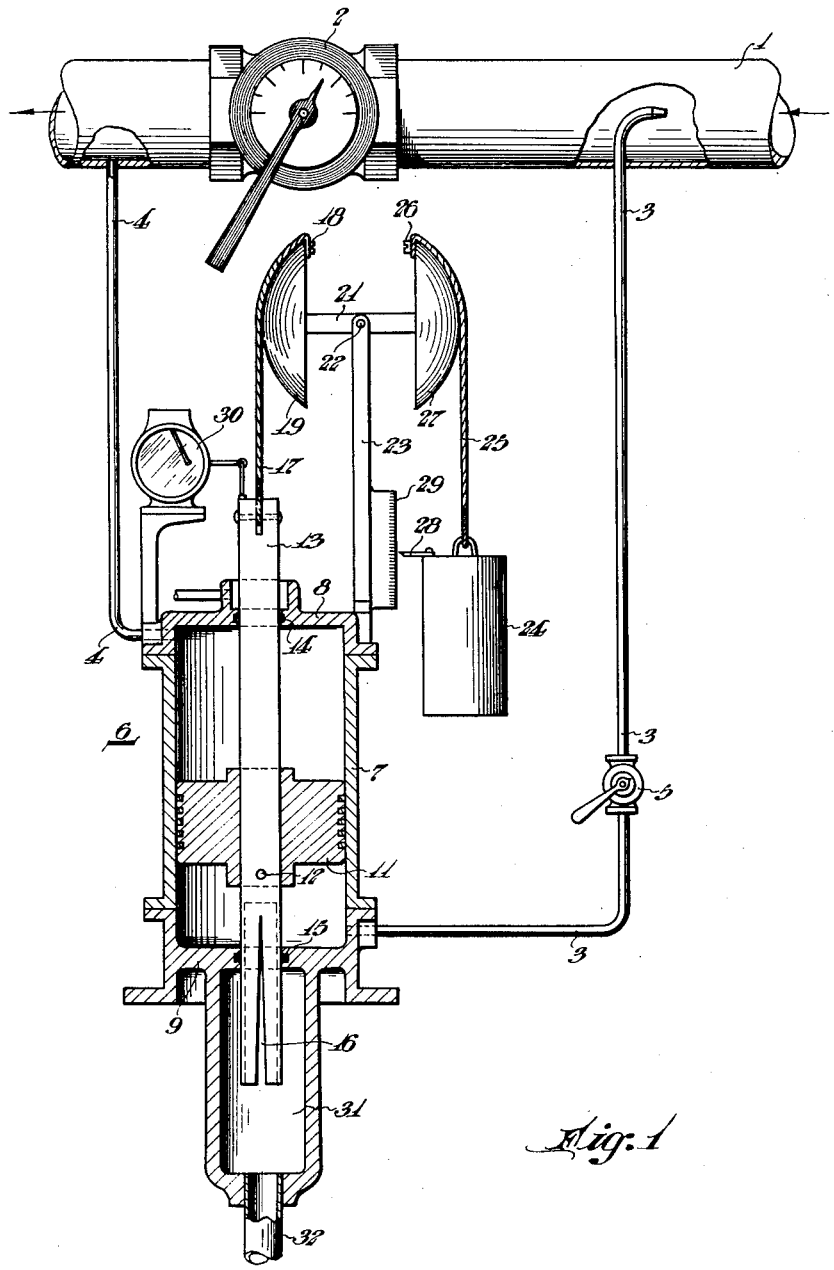

Jan. 9, 1934.   D. N. RANDOLPH   1,943,039
PROPORTIONING AND FEEDING DEVICE
Filed June 11, 1932   3 Sheets-Sheet 1

INVENTOR.
Dale N. Randolph.
BY
ATTORNEY.

Jan. 9, 1934.　　　D. N. RANDOLPH　　　1,943,039
PROPORTIONING AND FEEDING DEVICE
Filed June 11, 1932　　　3 Sheets-Sheet 3
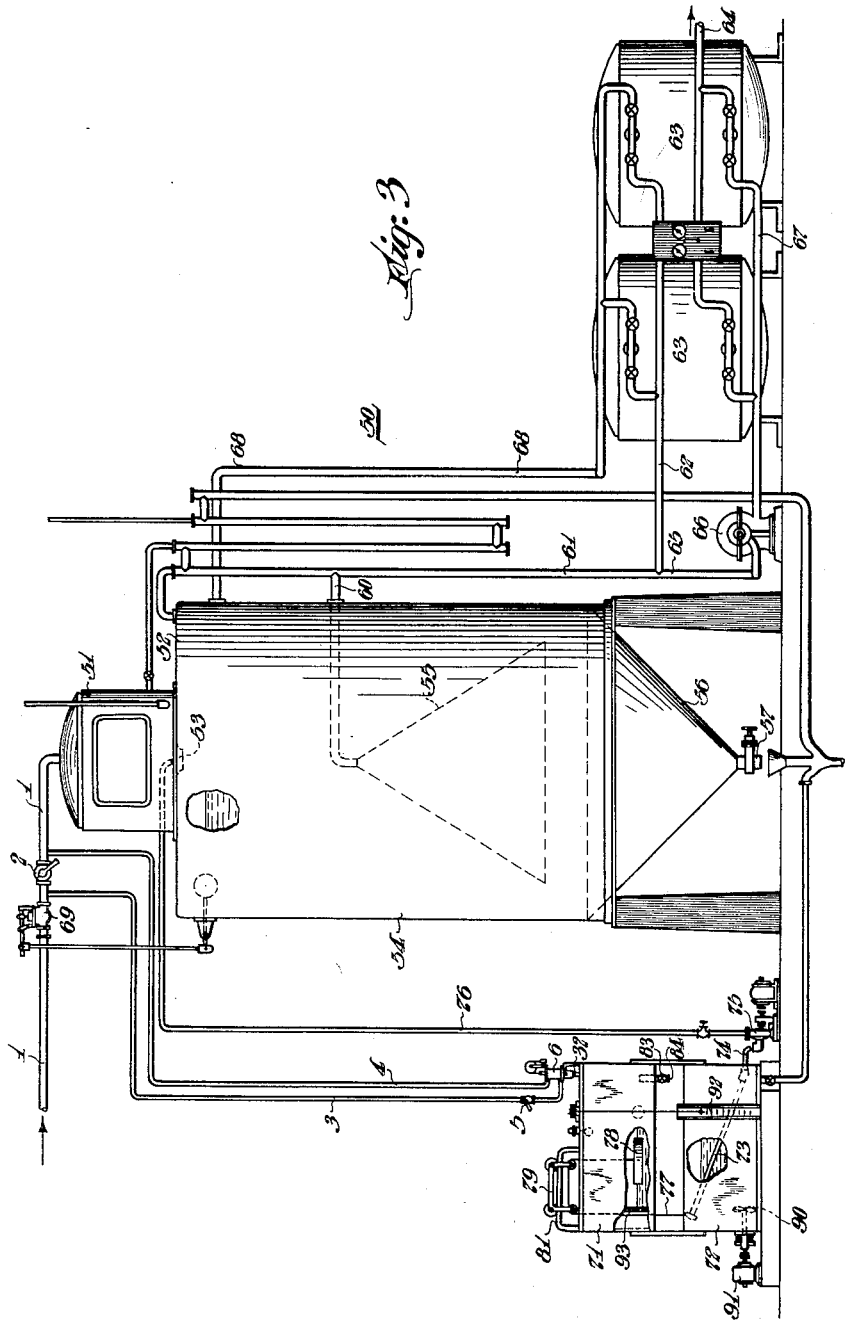
INVENTOR.
Dale N. Randolph.
BY
Horace Brooks Cooke
ATTORNEY.

Patented Jan. 9, 1934

1,943,039

UNITED STATES PATENT OFFICE 1,943,039

PROPORTIONING AND FEEDING DEVICE

Dale N. Randolph, Pittsburgh, Pa., assignor to Wm. B. Scaife & Sons Company, Oakmont, Pa., a corporation of Pennsylvania Application June 11, 1932. Serial No. 616,577

16 Claims. (Cl. 210—38)

This invention relates to proportioning and feeding devices,—that is to say, devices intended for the purpose of establishing a flow of fluid at a rate which is at all times proportional to the rate of some other flow of fluid. Such devices are useful in connection with water-treating apparatus, such as water softeners, as well as other fluid treating devices, and fluid mixing, sampling and measuring devices.

For example, in apparatus for softening water about to be delivered to boilers or to other points of consumption, it is necessary to deliver a fluid reagent to the water being treated in an amount which must be in proportion to the flow of water through the apparatus. The reagent in this instance comprises a solution of some appropriate chemical or chemicals of predetermined strength.

Various devices have been employed for this purpose but have been subject to disadvantages due to complexity, multiplicity of moving parts, and the like, and also due to frequent stoppages which occur as the result of the deposition of impurities carried by the water or other liquid being handled.

It is therefore an object of the present invention to provide proportioning and feeding apparatus of the character indicated, which is simple and effective, free from complications and liability to stoppage, and also of extreme accuracy.

A second object of my invention is to provide simple, effective and accurate means for establishing a flow of fluid through a conduit which is proportional to the flow of fluid in another conduit, both in instances where the source of fluid in the first-mentioned conduit originates from the other conduit and in instances where the fluids flowing through the two conduits are derived from independent sources.

A further object of my invention is to provide, in a device of the character indicated, means whereby the actual proportion of the rates of flow in two conduits may from time to time be varied, without, however, destroying the proportional relation between the two rates of flow.

A still further object of my invention is to provide means whereby a flow of fluid which has been proportional to another flow of fluid may be employed for the purpose of effecting the delivery of a still further flow of fluid in equal or proportionate amount to a desired point of delivery.

My invention has for further objects such other advantages and improvements in operation and construction as may be found to obtain in this specification and in the accompanying claims.

In general, my invention contemplates the provision, in association with a conduit for conveying fluid, of dependent or independent conduit means adapted to convey a second flow of fluid and in which last-mentioned conduit there is provided an orifice or the equivalent thereof, together with means for imposing around said orifice or equivalent a fluid pressure differential equal to or proportional to a fluid pressure differential in said first-mentioned conduit which depends upon the rate of flow of fluid in said first-mentioned conduit.

Thus I may provide an orifice in the first-mentioned conduit as well as an orifice in the second-mentioned conduit, together with automatic means for establishing an equal or proportionate fluid pressure differential around both of said orifices.

In instances where one of the two flows of fluid is to be used either directly for the preparation of a treating liquid to be delivered to the other flow of fluid or merely for the purpose of establishing the amount of a flow of treating liquid from a separate source, I further provide means for releasing treating liquid from a tank in accurate proportion and preferably in equal amount to the liquid delivered through one of the conduits. Such means may comprise a reservoir for accumulating the liquid delivered through one of said conduits together with improved means for releasing liquid from another reservoir in accordance with the rate in which said accumulation takes place.

I further provide apparatus of the general character indicated hereinabove which is especially suitable and advantageous for use in conjunction with water-softening apparatus or the like.

In order that my invention may clearly be set forth and understood I now describe, with reference to the accompanying drawings, various preferred forms in which it may be practiced and embodied. In these drawings—

Figure 2:
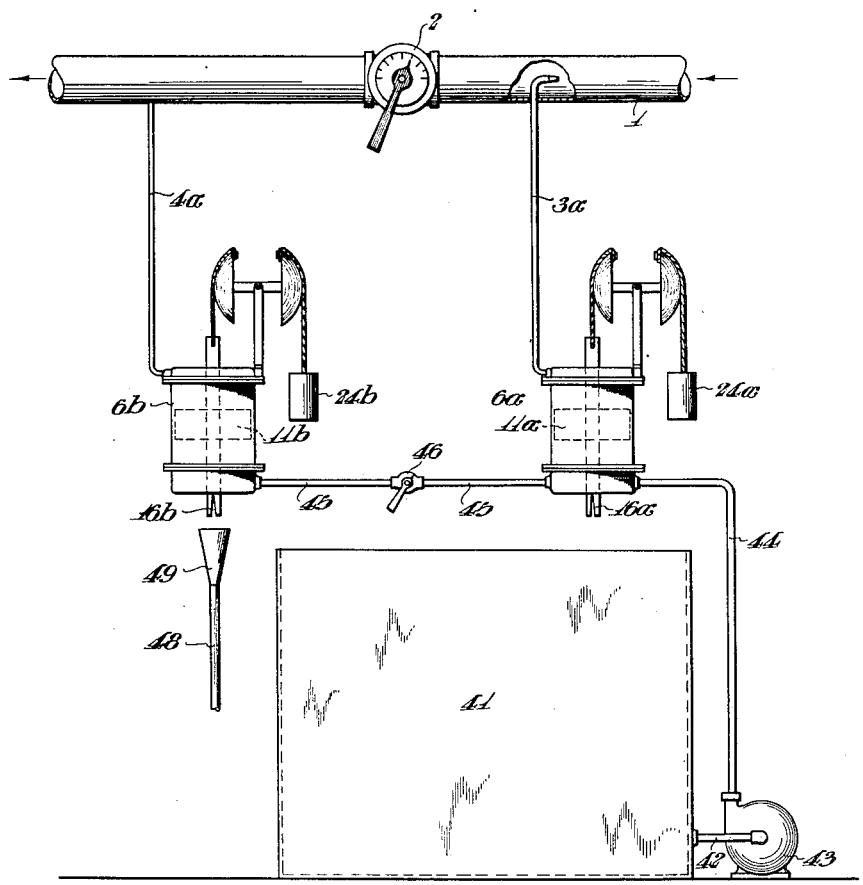

Figure 1 is a view, partly in elevation and partly in vertical section, of a novel proportioning device constructed in accordance with my invention;

Fig. 2 is an elevational view of an alternate form of fluid proportioning device also constructed in accordance with my invention, and Fig. 3 is a view, partly in elevation and partly in vertical section, of apparatus for softening water, including a proportioning device similar to that illustrated in Figure 1, and further illustrating means whereby said proportioning device is made effective to deliver water or treating liquid from a separate source to the water-softening apparatus proper in proportion to the rate of flow of water passing through the same.

Similar reference numerals designate similar parts in each of the several views of the drawings.

Referring to the drawings, and more particularly to Figure 1 thereof, there is illustrated a conduit 1 adapted to convey fluid, the direction of flow of fluid in this particular instance being indicated by the arrows shown on the drawings. In order to provide an indication of the rate of flow of fluid through the conduit 1, as well as an actuating force for purposes to be described herein below, that is dependent upon the rate of flow of fluid in the conduit 1, I provide in this instance an orifice 2 which may comprise a valve or cock having a variable setting.

I further provide means responsive to the fluid pressure differential around the orifice 2, which means in the present instance comprises a Pitot or impact tube 3 located on the up-stream side of the orifice 2 and a pressure or "static" tube 4 located on the down-stream side of the orifice 2. The forward edges of the Pitot or impact tube 3 are made as sharp as possible.

Thus the arrangement shown in Figure 1 is in part a combination of two forms of metering devices adapted to measure a pressure differential set up in the stream of fluid flowing through the conduit 1, which differential depends upon the rate of flow of the fluid.

It will be obvious to those skilled in the art that the apparatus thus far described is susceptible of considerable modification. Thus, the variable orifice 2 may be replaced by a fixed thin-plate orifice, or the orifice may be omitted altogether. Conversely, so long as an orifice is provided in the conduit 1 between the tubes 3 and 4, the impact tube 3 may be replaced by a tube similar to the tube 4 which simply measures the static rather than the kinetic pressure of the fluid on the up-stream side of the orifice 2. Or, again, the conduit 1 may be provided with a Venturi tube of conventional design.

While the arrangement shown in Figure 1 is particularly advantageous for the reason that it combines the desirable features of the Pitot tube with the amplifying effect of an orifice plate, it will be obvious to those skilled in the art that all of the arrangements noted above are more or less equivalent devices for establishing and measuring a fluid pressure differential within the conduit 1 which depends upon the rate of flow of fluid within the conduit. In any case this arrangement will comprise two subsidiary tubes or conduits communicating with the conduit in which the principal flow of liquid occurs, so disposed with respect to each other and with respect to the principal conduit that the differential between the derived fluid pressure within the two subsidiary conduits depends upon the rate of flow of fluid in said principal conduit.

In point of fact, the pressure differential around the orifice 2 varies as the square of the rate of flow of fluid through the conduit 1. When, however, an equal pressure differential is set up around an orifice is a second conduit, the rate of flow of fluid through said second conduit must necessarily be directly proportional to the rate of flow of fluid through the conduit 1.

In the instance shown in Figure 1, in which the tube 3 serves not only as a pressure tube but also as a conduit for withdrawing a proportionate amount of fluid from the conduit 1, the tube or conduit 3 is provided with an orifice 5 which may be, and preferably is, of the variable type, as illustrated in Figure 1.

The proportioning device proper which is designated generally by the reference numeral 6 comprises a cylinder 7 having end closures 8 and 9 respectively, and having mounted therein a piston 11 adapted for reciprocal movement within the cylinder 7. The piston 11 is attached by means of a pin 12, or otherwise to a shaft 13 which extends through the closures 8 and 9. The device 6 is sealed against excessive escape of fluid under pressure from within the cylinder 7 by means of suitable sealing rings 14 and 15 surrounding the shaft 13 and located in the end enclosures 8 and 9 respectively.

The lower portion of the shaft 13 which engages the closure 9 is preferably made hollow, as shown, and is provided with one or more slots 16 preferably tapering inwardly from the extreme lower end of the shaft 13. The closure 9, the body of the shaft 13 and the slot or slots 16 thus provide a valved outlet from that portion of the interior of the cylinder 7 lying below the piston 11.

The shaft 13 and piston 11 are suspended by means of a metallic tape or flexible cord 17 attached by means of suitable fasteners 18 to a segment 19 mounted on one end of a lever 21 fulcrumed on a shaft or knife-edge 22 attached to a support 23. A counterweight 24 is suspended by means of a metallic tape or flexible cord 25 attached by means of suitable fasteners 26 to a segment 27 rigidly attached to the end of the lever 21 opposite to the segment 19. The counterweight may carry an indicator 28 which travels up and down in juxtaposition to a graduated scale 29 which may be conveniently mounted upon the support 23, the position of the indicator 28 with respect to the scale 29 thus indicating the position of piston 11 and the extent to which the orifices 16 are uncovered, and serving as means for indicating the rate of flow of fluid through the conduit 3. Similarly, a recording device 30 may be operatively connected to the shaft 13 for the same purpose.

The tube or conduit 4, as shown in the drawings, is in communication with the upper portion of the interior of the cylinder 7 lying above the piston 11, while the tube or conduit 3 is in communication with the lower portion of the interior of the cylinder 7 lying below the piston 11.

Liquid which may escape from the lower portion of the interior of the cylinder 7 through the orifice or orifices 16 is received into a cup 31 having an outlet conduit or drain 32. The counterweight 24 is of such size that, in the absence of any pressure differential above and below the piston 11 and the cylinder 7, the piston 11 will be biased downwardly and will travel to its lowermost position in the cylinder 7, in which position no portion of the orifice or orifices 16 will lie above the end closure 9. In this position of the piston 11, escape of fluid from the lower portion of the interior of the cylinder 7 into the cup 31 and the conduit 32 will be prevented.

In the operation of the device shown in Figure 1, the orifice 2 in the conduit 1 is adjusted for any desired pressure differential range. Under actual conditions of use, this may, for example, be a fluid pressure differential corresponding to from 1" to 12" of mercury and may average about 6" of mercury.

Assuming fluid to be flowing through the conduit 1, fluid pressures will be set up within the conduits 3 and 4, the differential between these pressures depending upon the rate of flow of fluid through the conduit 1, that is to say, a higher fluid pressure will obtain in conduit 3 than obtains in conduit 4. Since the pressures in the conduits 3 and 4 are derived from those in conduit 1, it will at once be obvious that the fluid pressure in the conduit 1 on the up-stream side of the orifice 2 will be directed against that side of the orifice 5 which is nearest the conduit 1. The static pressure within the conduit 1 on the down-stream side of the orifice 2 will be communicated through the tube or conduit 4 to that portion of the interior of the cylinder 7 lying above the piston 11.

The fluid pressure within the tube or conduit 3 is communicated to that portion of the interior of the cylinder 7 lying below the piston 11. Assuming the piston 11 to have been in its lowermost position, the differential between the fluid pressures below and above the piston 11, respectively, will tend to cause the piston 11 to rise within the cylinder 7.

As the piston 11 rises within the cylinder 7 the orifice or orifices 16 is or are uncovered, the extent of the opening increasing as the piston 11 rises. The piston 11 will rise until an opening is provided by the orifice or orifces 16 of such size as to permit a sufficient flow of fluid out of the lower portion of the interior of the cylinder 7 to equalize the fluid pressures above and below the piston 11. Assuming the rate of flow of fluid through the conduit 1 to be constant, an equilibrium position will thus be reached by the piston 11, in which position the fluid pressures above and below the piston 11 are identical.

In this equilibrium position of the piston 11, since the pressure within the cylinder 7 below the piston 11 is identical with that in the cylinder 7 above the piston 11, and since the conduit 3 communicates the pressure within the lower portion of the cylinder 7 to the down-stream side of the orifice 5, the pressure differential imposed upon the fluid around the orifice 5 will correspond substantially identically to the fluid pressure differential which obtains in the fluid around the orifice 2.

Since the sole source of fluid which passes out through the drain conduit 32 is the tube 3, the actual flow of liquid through the tube 3 and through the drain conduit 32 is directly proportional to the rate of flow of fluid through the conduit 1. If the rate of flow of fluid within the conduit 1 increases, the piston 11 is caused to rise until a greater portion of the orifice or orifices 16 is or are uncovered, an equilibrium again being established so that the rate of flow of fluid through the conduit 3 and the drain conduit 32 increases proportionately.

The tapered shape of the orifice or orifices 16 is advantageous in that it tends to overcome and prevent obstruction of the outlet formed by the orifice. Thus, if a small pebble were to obstruct that portion of the orifice 16 lying above the closure 9, the piston 11 would simply and automatically rise until an opening sufficient to permit the passage of the pebble therethrough would be uncovered. Any permanent obstruction in the upper portion of the orifice 16 is similarly compensated for by a corresponding rise of the piston 11, and in many cases this rise alone is sufficient to dislodge the obstructing material.

Where the two flows of fluid to be proportioned to each other originate from different sources, the apparatus shown in Fig. 2 is employed. In this instance I provide two proportioning devices 6a and 6b similar to the device 6 shown in Figure 1. The proportioning devices 6a and 6b are provided with pistons 11a and 11b, counterweights 24a and 24b, etc.

In this instance, however, that portion of the interior of the proportioning device 6a lying above the piston 11a is in communication with a tube 3a which communicates with the conduit 1 on the up-stream side of the orifice 2, and that portion of the interior of the proportioning device 6b lying above the piston 11b is in communication with a tube 4a which communicates with the conduit 1 on the down-stream side of the orifice 2.

In this instance, the source of fluid to be delivered to a point of use at a rate proportional to the rate of flow of fluid within the conduit 1 is provided in a reservoir 41 which is connected to the lower portion of the interior of the proportioning device 6a by means of a conduit 42, a pump 43 and a conduit 44. The lower portions of the proportioning devices 6a and 6b lying below the piston 11a and 11b, respectively, are in communication with each other through a conduit 45 having an orifice 46 therein. The orifice 46 may be of the variable type as shown in the drawings or it may be of the fixed type.

Fluid which escapes from the lower portion of the proportioning device 6a through the orifice or orifices 16a may return to the reservoir 41 while that which escapes from the lower portion of the proportioning device 6b through the orifice or orifices 16b is delivered to a conduit 48 having a funnel or cup 49 and passes to the point of use.

In the operation of the device illustrated in Fig. 2, the fluid pressures above and below the orifice 2 in the conduit 1 are communicated to the upper portions of the proportioning devices 6a and 6b, respectively. The pump 43 being operated to deliver fluid under pressure somewhat in excess of that which obtains in the tube 3a, the piston 11a rises until the orifice 16a permits the release of sufficient fluid to equalize the pressures above and below the piston 11a, as a result of which the pressure communicated through the conduit 45 to the up-stream side of the orifice 46 is equal or substantially equal to the fluid pressure in the conduit 1 on the up-stream side of the orifice 2.

Likewise, the piston 11b rises until the orifice 16b permits a sufficient flow of fluid out of the lower portion of the interior of the proportioning device 6b to equalize the pressures above and below the piston 11b. This results in establishing a fluid pressure on the down-stream side of the orifice 46 which is equal or proportional to that on the down-stream side of the orifice 2. Consequently, the fluid pressure differential around the orifice 46 is at all times equal or substantially equal to the fluid pressure differential around the orifice 2 in the conduit 1, and since all fluid passing through the conduit 48 must pass through the orifice 46 it follows that the rate of flow through the conduit 48 is at all times directly proportional to the rate of flow of fluid through the conduit 1.

In the apparatus shown in Figure 1 and Fig. 2 it will be obvious that a change in the setting of the orifice 2 or of the orifices 5 or 46, respectively, will effect a change in the actual ratio of fluid passing through the conduit 1 and the conduits 32 and 48, respectively. But in any event, assuming the settings of the orifices 2, 5 and 46 to be constant, a true proportion is automatically maintained at all times between the principal and subsidiary flows of fluid.

In Fig. 3, I have illustrated a preferred manner in which my invention may be applied to a water-softening device of known design.

As shown in Fig. 3 the conduit 1 is arranged to supply water to water-softening apparatus indicated generally by the reference numeral 50, and especially adapted for the use of what is commonly known as the "hot lime-soda process" of softening water.

Referring to Fig. 3, the water to be treated passes through the conduit 1 into a heater 51 of conventional design where the temperature of the water is raised to the required point. The water then passes into a treating tank 52, being mixed with a suitable amount of reagent solution at a point 53. The treating tank 52 is usually divided into a settling chamber 54 and an uptake or receiving chamber 55, and is provided with a preferably conical bottom 56 having a valved drain 57 for removal of sludge comprising impurities precipitated out of the water in the course of treatment thereof.

Precipitation of the impurities of the water commences in the upper portion of the settling chamber 54, the impurities tending to fall to the lower portion of the tank 52, while the clarified water is drawn off through the up-take chamber 55 and conduits 60, 61 and 62 to one of a pair of filters 63. The water is further clarified in the filter 63, which it traverses in a downward direction, and finally passes to the conduit 64 to a point of use. A conduit 65, a pump 66, a conduit 67 and a conduit 68 are provided for the purpose of back-washing the filter 63 and returning the back-wash water to the treating tank 52 whenever desired. This portion of the apparatus is more or less conventional and not necessary to be described in detail for the reason that it does not form a part of my invention.

A float-controlled valve 69 is provided for the purpose of introducing water to the apparatus 50 as fast as it is withdrawn through the conduit 64.

In a device of this character it is necessary to add a softening material to the water in proportion to the rate of flow of water through the device. The manner in which this is accomplished according to my invention is as follows:

The inlet conduit 1 is provided with an orifice 2 and conduits or tubes 3 and 4 leading to a proportioning device 6, the apparatus being identical to that shown in Figure 1.

In this instance, the conduit 32 leading from the proportioning device 6 is so located as to deliver the fluid passing therethrough to a reservoir or proportioning tank 71, lying above a solution tank 72. The cross-sectional areas of the tanks 71 and 72 are preferably substantially identical.

In Fig. 3 the solution tank 72 is shown "full" while the proportioning tank 71 is "empty"—that is to say, the tank 72 contains the minimum amount of water while the solution tank 72 contains the maximum amount of solution.

Solution is removed from the solution tank 72 by means of a swinging outlet pipe 73 open at one end and pivotally connected at the other end to a conduit 74 leading to a pump 75, which in turn delivers the solution through a conduit 76 to the point 53 within the treating tank 52.

The open end of the swinging outlet pipe 73 is supported by means of a flexible cord 77 connected at the other end to a float 78 lying within the proportioning tank 71. The cord 77 passes over a pulley device 79 mounted for free movement upon a horizontal track 81.

In prior devices, it has been found that the use of a fixed pulley for the cord 77 connecting the float in the proportioning tank and the swinging pipe in the solution tank was productive of inaccuracy due to the fact that the open end of the swinging pipe does not move in a straight line but in an arc. However, in the device illustrated in Fig. 3, the ability of the pulley device 79 to move longitudinally compensates for this difficulty and insures that any rise of the liquid level in the proportioning tank 71 will effect an equal lowering of the liquid level in the solution tank 72. Since the horizontal cross-sectional areas of the tanks 71 and 72 are the same, it will be apparent that the addition of a given amount of water to the tank 71 will thus effect the withdrawal and delivery to the treating tank 52 of an equal quantity of solution from the tank 72.

Moreover, since the source of water entering the proportioning tank 71 is the proportioning device 6, the amount of solution delivered to the tank 71 is directly proportional to the amount of water entering the tank 52 from the conduit 1.

In the operation of the device, when the liquid level in the tank 71 rises to the permissible maximum height, a valve 83 in a conduit 84 leading from the tank 71 to the tank 72 is opened and a known amount of water is thus delivered to the solution tank 72. At the same time the proper amount of chemical is added to the water entering the solution tank 72, so that, when the solution thereby prepared is later delivered to the tank 52, it will contain just the proper amount of reagent to effect a softening of the water concurrently passing through the tank 52.

An agitator 90 driven by a motor 91 may be provided for the purpose of maintaining the uniformity of the solution in the tank 72, and either the tank 71 or the tank 72 may be conveniently provided with a level indicator 92 as shown. A well 93 is provided in the tank 71 for the purpose of receiving the cord 77.

While I have described my invention hereinabove with respect to several specific embodiments and illustrative examples, it will at once be obvious to those skilled in the art that my invention is capable of considerable modification in detail, and capable of use for various purposes. Thus, my invention may be used as a sampling device for the purpose of removing an average sample from a flow of fluid, whether that fluid be liquid or gaseous. It may also be used as a metering device, the subsidiary flow of fluid being used as an indication of the rate of flow of a primary flow of fluid, or as an actuating means for operating mechanism of some sort in proportion to the rate of flow of fluid through the conduit.

My invention is therefore not limited to such illustrative examples as have been set forth herein, but may variously be embodied within the scope of the claims hereinafter made.

I claim as my invention:

1. A proportioning device comprising, in combination, a conduit for conveying fluid, a second conduit in communication therewith, a third conduit also in communication therewith, the disposition of said second and third conduits with respect to each other and with respect to said first-mentioned conduit being such that the differential between the derived fluid pressures within said second conduit and said third conduit depends upon the rate of flow of fluid in said first-mentioned conduit, conduit means for conveying a second flow of fluid to a point of use, an orifice in said conduit means, and means automatically adapted to impose a fluid pressure on one side of said orifice substantially equal to the derived fluid pressure within said second conduit and a fluid pressure on the other side of said orifice substantially equal to the derived fluid pressure within said third conduit, whereby the rate of flow of fluid in said conduit means is maintained in predetermined proportion to the rate of flow of fluid in said first-mentioned conduit.

2. A proportioning device comprising, in combination, a conduit for conveying fluid, a subsidary conduit in communication therewith, a second subsidiary conduit also in communication therewith, the disposition of said subsidiary conduits with respect to each other and with respect to said first-mentioned conduit being such that the differential between the derived fluid pressures within said subsidiary conduits depends upon the rate of flow of fluid in said first-mentioned conduit, conduit means for conveying a second flow of fluid to a point of use, an orifice in said conduit means, means adapted to equalize the fluid pressure within one of said subsidiary conduits and the fluid pressure on one side of said orifice, and separate means adapted to equalize the fluid pressure within the other of said subsidiary conduits and the fluid pressure on the other side of said orifice, whereby proportionate rates of flow of fluid are maintained in said first-mentioned conduit and said conduit means.

3. A proportioning device comprising, in combination, a conduit for conveying fluid, an orifice therein, a subsidiary conduit in communication with said first conduit on one side of said orifice, a second subsidiary conduit in communication with said first conduit on the other side of said orifice, an orifice located in one of said subsidiary conduits, and means automatically adapted to equalize the fluid pressure on the down-stream side of said last-mentioned orifice and the fluid pressure within the other subsidiary conduit.

4. A proportioning device comprising, in combination, a conduit for conveying fluid, an orifice therein, a subsidiary conduit in communication with said first conduit on one side of said orifice, a second subsidiary conduit in communication with said first conduit on the other side of said orifice, an orifice located in one of said subsidiary conduits, and means automatically adapted to equalize the fluid pressure on the down-stream side of said last-mentioned orifice and the fluid pressure within the other subsidiary conduit, and a fluid outlet in communication with the down-stream side of last-mentioned orifice.

5. A proportioning device comprising, in combination, a conduit for conveying fluid, an orifice therein, a subsidiary conduit in communication with said first conduit on one side of said orifice, a second subsidiary conduit in communication with said first conduit on the other side of said orifice, an orifice located in one of said subsidiary conduits, means automatically adapted to equalize the fluid pressure on the down-stream side of said last-mentioned orifice and the fluid pressure within the other subsidiary conduit, a fluid outlet in communication with the down-stream side of said last-mentioned orifice, and means adapted to vary the effective size of said outlet in accordance with the pressure differential around said first-mentioned orifice.

6. In a proportioning device, a conduit adapted to convey fluid, two cylinders having pistons therein, two pressure tubes adapted to communicate fluid pressures from said conduit to said cylinders, a second conduit leading from a source of fluid under pressure to the opposite side of one of said cylinders, an outlet valve in communication with said second conduit that is operatively connected to the piston in said cylinder, a third conduit having an orifice therein and communicating with said second conduit and the opposite side of the other cylinder, and an outlet valve in communication with said second conduit that is operatively connected to the piston in said other cylinder.

7. A proportioning device comprising, in combination, a conduit for conveying fluid, a second conduit in communication therewith, a third conduit also in communication therewith, the disposition of said second and third conduits with respect to each other and with respect to said first-mentioned conduit being such that the differential between the derived fluid pressures within said second conduit and said third conduit depends upon the rate of flow of fluid in said first-mentioned conduit, an orifice in said third conduit, means automatically adapted to impose a differential pressure around the orifice in said third conduit equal at all times to the pressure differential between the derived fluid pressures within said second conduit and said third conduit, whereby the rates of flow of fluid in said first conduit and said third conduit are proportionately maintained, a tank adapted to receive liquid from said third conduit, a second tank, an outlet pipe in said second tank, said outlet pipe being pivotally mounted at one end and open at the other, a float in said first-mentioned tank, flexible means connecting said float with the open end of said pipe, and a pulley adapted to support said flexible means at an intermediate point.

8. In a proportioning and feeding device, a conduit adapted to convey fluid, means for establishing a proportionate flow of fluid in a second conduit, a tank adapted to receive said proportionate flow of fluid, a float in said tank, a second tank, a swinging outlet pipe in said second tank having its free, open end supported by flexible means from said float, and a pulley for said flexible means adapted for free horizontal movement in accordance with lateral movement of the free, open end of said swinging outlet pipe.

9. In a proportioning and feeding device, a conduit adapted to convey fluid, means for establishing a proportionate flow of fluid in a second conduit, a tank adapted to receive said proportionate flow of fluid, a float in said tank, a second tank, a swinging outlet pipe in said second tank having its free, open end supported by flexible means from said float, a pulley for said flexible means adapted for free horizontal movement in accordance with lateral movement of the free, open end of said swinging outlet pipe, and valved means for delivering the contents of said first-mentioned tank to said second tank.

10. In a device for proportioning the amount of fluid delivered by two main fluid conduits, a cylinder having a piston therein, the interior of said cylinder on one side of said piston being in communication with one of said conduits, and the interior of said cylinder on the other side of said piston being in communication with the other conduit, an outlet communicating with one end of said cylinder, and a valve element connected to said piston and located in said outlet.

11. In a device for proportioning the amount of fluid delivered by two main fluid conduits, a cylinder having a piston therein, the interior of said cylinder on one side of said piston being in communication with one of said conduits, and the interior of said cylinder on the other side of said piston being in communication with the other conduit, an outlet communicating with one end of said cylinder, and a cylindrical valve member connected to said piston and adapted to vary the effective size of said outlet in accordance with the position of said piston.

12. A proportioning device comprising a primary conduit adapted to convey a flow of fluid, a branch conduit communicating therewith, an orifice located therein, a third conduit communicating with said conduit, the disposition of said conduits being such that the differential between the derived fluid pressure in said branch conduit and said third conduit depends upon the rate of flow of fluid in said primary conduit, and means adapted to impose an equal pressure differential around said orifice.

13. A proportioning device comprising, in combination, a pair of conduits adapted to supply two flows of liquid, means located in each conduit responsive to pressure differentials depending upon the rates of flow in said conduits, means for maintaining the differential in one conduit in a fixed relation to that in the other, a reservoir adapted to receive liquid from one of said conduits, a second reservoir adapted to contain liquid, and means for releasing liquid from said second reservoir in fixed proportion to the amount of liquid delivered to said first-mentioned reservoir.

14. In apparatus of the character set forth, in combination a conduit adapted to convey a flow of liquid, a second conduit adapted to deliver a second flow of liquid in proportion to said first mentioned flow of liquid, a reservoir adapted to receive said second flow of liquid, a second reservoir adapted to contain a liquid, an overflow for liquid from said second reservoir, and means for lowering said overflow in fixed proportion to the rise of the liquid level in said first-mentioned reservoir.

15. In apparatus of the character set forth, in combination a conduit adapted to convey a flow of liquid, a second conduit adapted to deliver a second flow of liquid in proportion to said first-mentioned flow of liquid, a reservoir adapted to receive said second flow of liquid, a second reservoir adapted to contain a liquid, a swinging overflow in said second reservoir, a float in said first mentioned reservoir, cable means connecting said float and said overflow, and a horizontally movable pulley supporting said tape means intermediate said float and said overflow.

16. In apparatus of the character indicated, a treating tank, conduit means for supplying a stream of liquid to be treated thereto, a reservoir adapted to contain a supply of a second liquid, means for delivering liquid from said reservoir to said treating tank, and means for releasing liquid from said reservoir for delivery to said treating tank comprising an outlet pipe located in said reservoir, said outlet pipe having an open end and a pivoted joint spaced therefrom, cable means supporting said pipe, means connected to one end of said cable means adapted to move said cable and lower said pipe in accordance with the flow of liquid through said conduit means, and a pulley device for supporting said cable between said motive means and said pipe, said pulley device being adapted to move freely in a horizontal direction to compensate for horizontal deflection of the open end of said pipe as it is lowered to release liquid from said reservoir.

DALE N. RANDOLPH.